United States Patent [19]

Searight et al.

[11] 4,182,548

[45] Jan. 8, 1970

[54] RETROREFLECTIVE MARKING TAPE

[75] Inventors: Charles E. Searight, Jackson, Miss.; James E. Heasley, Shaker Heights, Ohio

[73] Assignee: Ferro Corporation, Cleveland, Ohio

[21] Appl. No.: 812,851

[22] Filed: Jul. 5, 1977

[51] Int. Cl.$^2$ .................................................. G02B 5/12
[52] U.S. Cl. ......................................... 350/103; 350/97
[58] Field of Search ..................... 350/97, 103, 105; 404/14, 15

[56] References Cited

U.S. PATENT DOCUMENTS

| | | | |
|---|---|---|---|
| 2,991,698 | 7/1961 | Leubaz | 350/105 |
| 3,587,415 | 6/1971 | Eigenmann | 350/97 |
| 3,790,293 | 2/1974 | Heenan et al. | 404/15 |
| 3,922,065 | 11/1975 | Schultz | 350/103 |
| 3,980,393 | 9/1976 | Heasley et al. | 404/12 |
| 4,020,211 | 4/1977 | Eigenmann | 404/14 |
| 4,040,760 | 8/1977 | Wyckoff | 404/14 |

FOREIGN PATENT DOCUMENTS

1104379  2/1968  United Kingdom ............... 404/14

Primary Examiner—John K. Corbin
Assistant Examiner—B. W. de los Reyes
Attorney, Agent, or Firm—Milton L. Simmons; Wesley B. Taylor

[57] ABSTRACT

A retroreflective marking material is disclosed comprising a sheet having at least some light-transmitting portions, a light-refracting surface on one side, and a plurality of trihedral light-reflecting units of three mutually perpendicular facets on the other side adapted to be adhered to a working site. The light-reflecting units are oriented to reflect light having relatively high angles of incidence with respect to the sheet. The marking material may be used as a tape for marking roads and is effective whether wet or dry. Optionally, the sheet or tape has light-receptors which rise above the tape and are spaced apart along one direction of the tape, and the trihedral light-reflecting units are substantially opposite the light-receptors. Preferably, the light-reflecting units have the shape of a triangular-based pyramid, and the marking material retroreflects the light in two opposite directions.

24 Claims, 16 Drawing Figures

RETROREFLECTIVE MARKING TAPE

CROSS-REFERENCE TO RELATED CASES

Light-reflecting units of the rectangular parallelepiped type, as herein described, are disclosed in U.S. patent application, Ser. No. 635,634, filed Nov. 26, 1975, and U.S. patent application, Ser. No. 652,236, filed Jan. 26, 1976, both applications being in the name of James H. Heasley.

BACKGROUND OF THE INVENTION

This invention relates to a retroreflector which may be used wherever light reflection is desired. A leading application of the retroreflector is as a marking tape for roadways, pavements, airport runways, and the like, and therefore, it is described with respect to this use.

Retroreflective tapes or strips are mounted on the surface of a roadway, such as along its center line or shoulers, to delineate paths or lanes for traffic, or at intersections to define stopping lines or cross-lanes for traffic, both vehicular and pedestrian. Markers of this type are mounted in spaced apart relation and serve to guide traffic in following or traversing a roadway, or in following a curve or grade in the roadway. Particularly to assist a driver of a vehicle at night, these markers have light reflectors which catch and return incident beams of light from vehicular headlights back toward the source of the light. Since automobiles of recent vintage have quite powerful headlights, the use of marking tapes has become more widespread. Marking tapes contribute to traffic safety such as when roads are wet from rain. Under certain conditions, such as fog, light-reflecting road marking means can be the only way of orienting a driver to a changing direction of a road.

Several forms of retroreflective marking tapes have been suggested. They suffer from one or more limitations, such as reflecting too small a proportion of incident light while an approaching vehicle is still at an appreciable distance; or being susceptible excessively to exposure to the weather, particularly rain alone or with subsequent freezing. The practice has been to place lightreflecting elements at or even above the upper level of the road marking tape. But at this location, the light-reflecting units are not only subject to wear and even breakage from vehicular and foot traffic, but as well to erosion and the damaging effects due to entry of water and the like. Further, the accuracy and intensity of light-reflection of such marking tapes are often adversely affected when wet by rain.

For example, in U.S. Pat. No. 3,587,415 to Eigenmann a marking tape is disclosed having a plurality of spaced elements arranged on and partly embedded in the top of a base strip, the elements being of a composition having a substantial amount of microspheroids to provide light reflection.

U.S. Pat. No. 3,920,346 to Wyckoff discloses a marker strip provided with spaced wedges having embedded centrally therein an upwardly oriented retroreflective material, such as glass beads, in right-angled position with respect to a roadway. In such a construction, there is no effort to orient refracted light with the retroreflective material so as to obtain maximum reflectivity. Even more serious, should a wedge become broken for any reason, water and like debris have easy entry and access to the retroreflective material to destroy its effectiveness.

U.S. Pat. No. 3,935,365 to Eigenmann discloses a tape material having a twin-layer structure including a lower relatively thin support layer and an upper principal thicker layer formed of a composition having hard crystalline particles and light-reflecting particles embedded therein at various levels.

SUMMARY OF THE INVENTION

The principal object of the present invention is to provide in sheet form a retroreflector of relatively simple design which has efficient retroreflectivity and which is particularly well suited for use as a retroreflective marking tape. A further object is to provide a marking tape in which the light-reflecting units are shielded by the tape rather than exposed by it, so that the units are protected against wear and destruction by the elements such as rain water.

In one form, the retroreflective marking material is preferably fabricated from an organic polymeric resin in the form of a sheet having at least some light-transmitting portions, a light-refracting surface on one side, and a plurality of trihedral light-reflecting units having three mutually perpendicular facets on the other side, such other side being adapted to being adhered to a working site. As a modification, light-receptors may rise above one side of the sheet and be spaced along one direction of the sheet, but in the present construction the trihedral light-reflecting units are shielded by being placed on the other side of the sheet or at the interface between the sheet and the light-receptors. The light-reflecting units are preferably coated with metal to aid in their reflecting function and can be arranged to be bidirectional with respect to retroreflecting light.

Although the light-reflecting units must be trihedral and therefore comprised three mutually perpendicular facets, the size of the facets and their optical orientation may vary. For example, such units may be cube corners or rectangular parallelepipeds. A preferred form is that of a triangular-based pyramid which is well suited for use in bidirectional reflection.

DESCRIPTION OF THE PREFERRED EMBODIMENTS

Several embodiments of the general structure of the retroreflective marking tape are described, after which different light-reflecting units are considered, any of which may be used with a tape. Any one embodiment or modification may be used with any one or more other embodiments or modifications.

Figure 1:
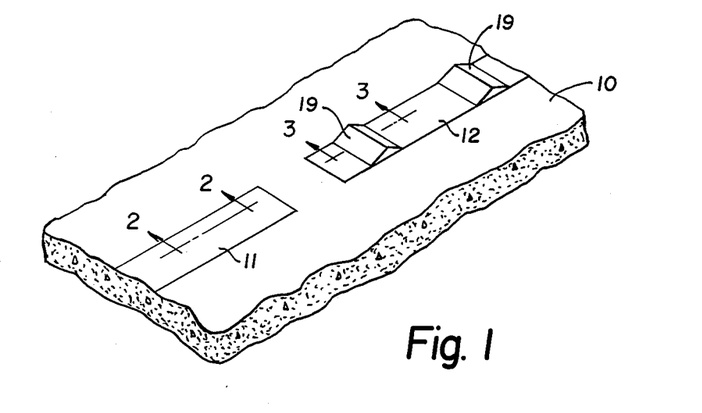
FIG. 1 is a fragmentary, perspective view of a roadway having two forms of the present retroreflective marking tape adhered thereto.
Figure 2:
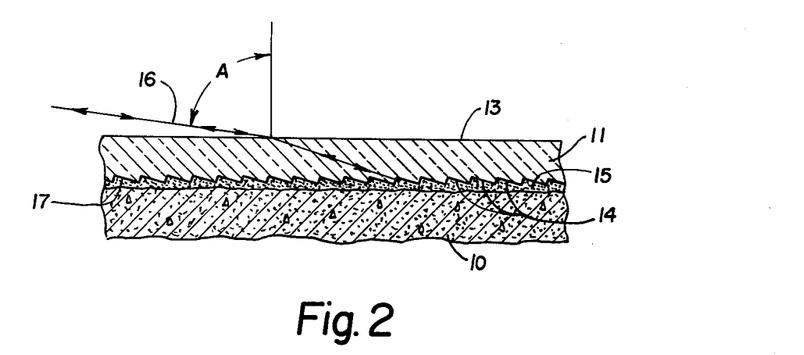
FIG. 2 is an enlarged cross-section of FIG. 1 on the line 2—2.
Figure 3:
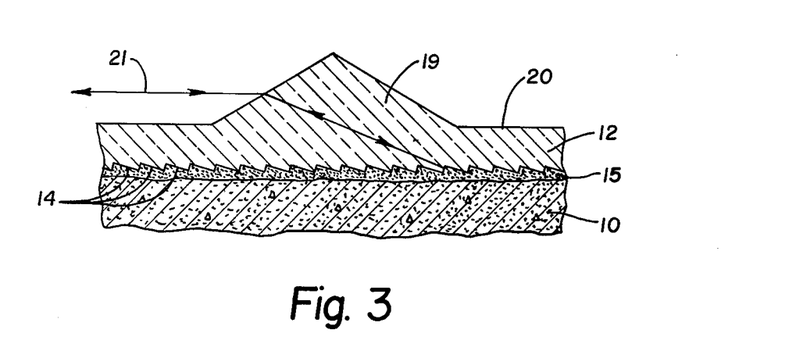
FIG. 3 is an enlarged cross-section of FIG. 1 on the line 3—3.

Referring to FIG. 1, a roadway 10 which may be of any known construction has retroreflective marking tapes 11 and 12 adhered thereto which represent two different embodiments and which are shown in enlarged cross-section by FIGS. 2 and 3, respectively. Any embodiment of the tape may be in the form of a straight strip, continuous or discontinuous, or arranged in the form of circles, polygons, arrows, letters, symbols, and the like. Preferably, the tape is flexible to facilitate handling and application.

In FIG. 2, tape 11 has a refracting surface 13 and a plurality of trihedral light-reflecting units 14, having three mutually perpendicular facets, on the other side. An adhesive 15 secures tape 11 to roadway 10. The compositions used for tape 11 and adhesive 15 may be the same for all embodiments. The body of tape 11, for example, must at least have some portions that are light-transmitting through which light reaches light-reflecting units 14 and may be fabricated from any suitable durable, weather resistant material, such as ceramic, glass, or synthetic resinous plastic materials, such as polyvinyl chloride, the polycarbonates like the polycarbonate of bisphenol A, and especially the acrylates like polymethacrylate and polymethylmethacrylate resins. Such compositions may be glazed or pigmented, if desired, to impart colors.

Adhesive 15 may be any suitable material sufficiently adhesive to hold tape 11 with respect to roadway 10. Examples of suitable adhesives include natural ones like glue or bitumen, or synthetic resinous adhesives like epoxy, polyester, or polyurethane resins. Thermosetting cements such as rubber hydrochloride may also be used. Still other useful adhesives are described in the cited U.S. Pat. Nos. 3,585,415 and 3,935,365 to Eigenmann, the disclosures of which are hereby incorporated by reference.

The trihedral light-reflecting units 14, have three mutually perpendicular facets and may be any of those hereinafter more fully described. In the embodiments of FIG. 2, units 14 extend continuously along the underside of tape 11. Because of the positioning of the marking tape on a roadway, that is, appreciably below normal eye level, units 14 must be oriented to reflect light having relatively high angles of incidence with respect to the tape. This is illustrated in FIG. 2 by an incident ray of light represented at 16 which strikes tape 11 at an angle of incidence A that becomes almost a glancing angle. Ray 16 is refracted by surface 13, retroreflected by units 14, and returned in substantially the same direction, as illustrated.

As used herein, the optical axis of a light-reflecting unit 14 is that axis of the trihedral configuration along which the unit is maximally retroreflective. In the present tape, the optical axes of units 14 are preferably substantially parallel to the light they receive, that is, to the direction ray 16 takes after being refracted by surface 13. However, satisfactory performance can still be achieved if the optical axes deviate from the direction of the refracted light, for example, up to about 15 degrees. To aid in their reflecting function, light-reflecting units 14, and the units of any embodiment, may be coated with metal or metallized in a manner known in the art to form a metallic layer 17. Aluminum is the preferred metal for this purpose and can be applied by vapor deposition. Adhesive 15 fills the volume between the lower, embossed side of tape 11, having the light-reflecting units 14, and roadway 10 to secure tape 11 to the roadway.

The size of the tape is not critical. In one instance, a marking tape was 4 inches in width and about 2 mils to about 10 mils in thickness. In the embodiment of FIG. 2, the body of tape 11 actually protects light-reflecting units 14 from wear and exposure to the elements. The tape is operative whether wet or dry.

FIGS. 3 through 8 illustrate modified forms of the marking tape which include the use of light-receptors and optional positioning of the light-reflecting units. It is within the contemplation of the present tape to incorporate light-receptors which rise above the tape and are spaced apart along one direction. The light-receptors may have any polygonal or spherical cross-section and are used to garner rays of incident light and assist in focusing them toward the light-reflecting units. The latter can be placed at different stations below the light-receptors while still constituting an integral part of the tape and still being protected by an overlying segment of the tape.

For example, in FIG. 3, a tape 12 has light-receptors 19 which rise above intervening flat areas 20 so as to be spaced lengthwise of the tape. Light-receptors 19 are triangular in cross-section in the longitudinal direction of tape 12. Light-reflecting units 14 extend continuously along the underside of tape 12 although, if preferred, they can extend along only that section of the underside which is substantially opposite light-receptors 19. An adhesive 15 secures tape 12 to roadway 10. The use of a light-receptor 19 permits a slightly different orientation of light-reflecting units 14 in aligning their optical axes with respect to the direction of the refracted light. For example, an incident ray of light 21 may be refracted and retroreflected as illustrated in FIG. 3.

Figure 4:
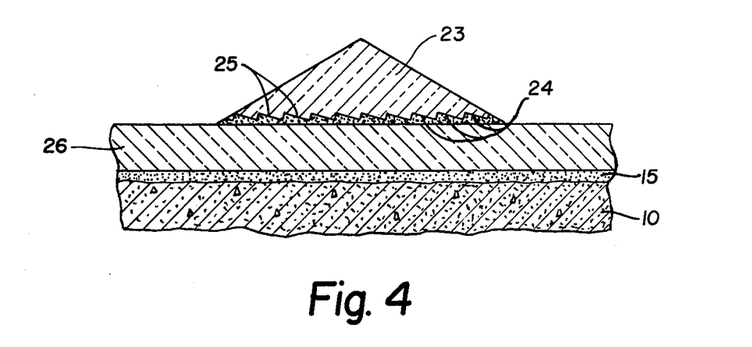
FIG. 4 is a cross-section like FIG. 3 and illustrates light-reflecting units at the interface of light-receptors and the body of a marking tape.

It is possible to place light-reflecting units at the interface of light-receptors and the body of the tape. In this case, the light-receptors may be separately fabricated and secured to the body of the tape by an adhesive. FIG. 4 illustrates a triangular light-receptor 23 having a plurality of light-reflecting units 24 formed as by embossing along its flat base. An adhesive 25 fills the cavities left by the light-reflecting units and secures light-receptor 23 to a strip 26 defining the marking tape, and adhesive 15 secures strip 26 to roadway 10. Adhesive 25 may be any of those previously described for adhesive 15. The separate fabrication of light-receptor 23 and strip 26 enables each to contain a different coloring pigment. For example, strip 26 can be colored white for daylight marking, while light-receptor 23 can be tinted red or green or still other color. In this case only light-receptor 23 need be light-transmitting.

Figure 5:
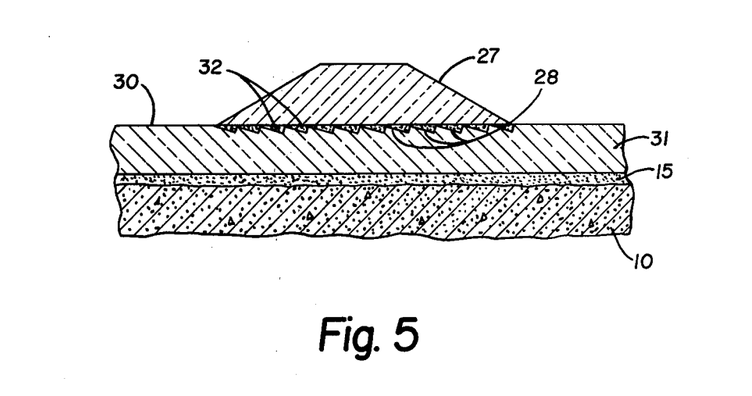
FIG. 5 is a cross-section like FIG. 3 and shows an alternate shape for a light-receptor as well as an alternate location of the light-reflecting units.

FIG. 5 illustrates a light-receptor 27 having a quadrilateral cross-section and also a further modification in that the wide bottom side of receptor 27 is flat. In this case, light-reflecting units 28 are formed in an upper surface 30 of a strip 31 defining the tape. An adhesive 32 fills the cavities of the light-reflecting units 28 to secure receptor 27 and strip 31 together, and adhesive 15 secures strip 31 to roadway 10. However, since in this case adhesive 32 fills units 28 and is therefore interspersed between light-receptor 27 and units 28, it is necessary that adhesive 32 be light-transmitting. Light-transmitting adhesives which can be used for this purpose are known in the art and include transparent epoxy resins, transparent polyurethanes, solvent-based synthetic rubbers, and the like. In the embodiments of FIGS. 4 and 5, strips 26 and 31 need not be light-transmitting and can be opaque. For this purpose such strips can be colored white, red, green, or still other colors.

Figure 6:
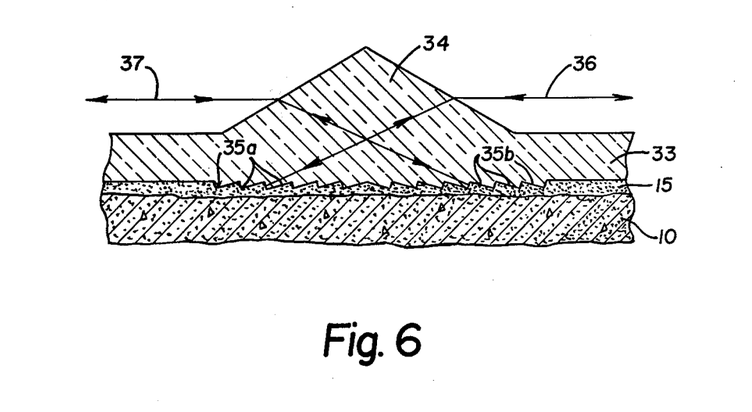
FIG. 6 is a cross-section like FIG. 3 and illustrates one arrangement for bidirectional light-reflection.

It is also possible to make the marking tape bidirectional, that is, to receive and retroreflect light from either of two opposite directions. FIG. 6 illustrates one embodiment of this modification in conjunction with a light-receptor and the use of light-reflecting units disposed only substantially opposite a light-receptor, although these structural features are not essential to bidirectional retroreflection. In the embodiment of FIG. 6, a tape 33 has a triangular shaped light-receptor 34 with light-reflecting units embossed along the underside of the tape, as in the embodiment of FIG. 3. However, in this instance the units extend along the underside a distance which corresponds generally to the length of receptor 34 along the tape and, further, are oriented so as to be bidirectional. Thus, light-reflecting units 35a on the left hand side as viewed in FIG. 6 have their optical axes arranged to be preferably parallel or to deviate no more than about 15 degrees from light approaching from the right side of the figure. The retroreflection of a ray of incident light 36 occurs therefore as illustrated in FIG. 6. Light approaching from the left side receives little retroreflectivity from units 35a. Conversely, light-reflecting units 35b on the right side as viewed in FIG. 6 have their optical axes arranged to be preferably parallel or to deviate no more than about 15 degrees from light approaching from the left. The retroreflection of a ray of incident light 37 occurs therefore as illustrated in FIG. 6. Light approaching from the right receives little retroreflection from units 35b. If desired, that portion of the tape containing units 35a may be tinted one color such as green, and that portion of the tape containing units 35b can be tinted another color such as red.

Marking tapes, and especially those having upward projections like the present light-receptors, are subject to rugged wear and treatment because of being almost constantly over-ridden by vehicular traffic, such as automotive tires, snow plows, and the like. In one form, a light-receptor of the marking tape may be elastically deformable and thereby adapted to return substantially to its original position after deformation. In this manner, the light-receptor resiliently yields to over-rolling vehicular traffic and prolongs its useful life. Yet, after deformation, the light-receptor immediately returns substantially to its original position where it is useful as before. For this purpose, the light-receptor can be fabricated from various elastomeric, resinous synthetic plastics. Polyvinyl chloride is one such elastomer that may be so used.

Figure 7:
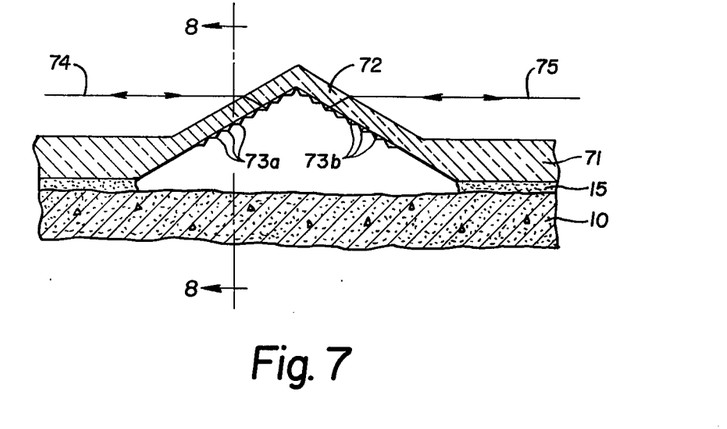
FIG. 7 is a cross-section like FIG. 3 and shows the use of an elastically deformable light-receptor.
Figure 8:
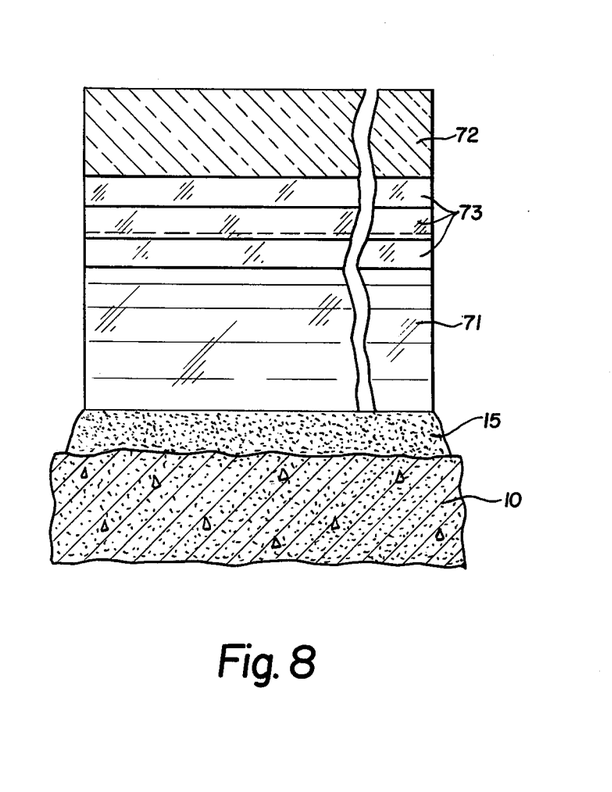
FIG. 8 is a section of FIG. 7 on the line 8—8.

FIGS. 7 and 8 illustrate a marking tape having an elastically deformable light-receptor as well as an adaption of this form for bidirectional light-retroreflection. Preferably, the light-receptor is hollow and the light-reflecting units are disposed along an inner side of the light-receptor. In the illustrated embodiment, a marking tape 71 has a light-receptor 72 of triangular cross-section in the longitudinal direction of the tape. Light-receptor 72 is hollow and may be open from the underside of tape 71 as illustrated. Adhesive 15 secures tape 71 to roadway 10. Light-reflecting units are conventionally formed along an inner side of light-receptor 72.

The illustrated embodiment is bidirectional. Light-reflecting units 73a and 73b are formed along inner and opposite sides of light-receptor 72. Thus, an incident ray of light 74 approaching from the left as viewed in FIG. 7 is refracted by the left hand side of the triangular shaped light-receptor 72 and retroreflected by light-reflecting units 73a as illustrated. An incident ray of light 75 approaching from the right is refracted by the right hand side of triangular light-receptor 72 and retroreflected by light-reflecting units 73b. In use, light-receptor 72 can be smashed flat and immediately bounce back to its original station. Alternatively, hollow-light-receptor 72 may be filled with a compressible material, such as foamed elastomeric material, which is secured inside the hollow-pocket formed by light-receptor 72 and/or to roadway 10.

The light-reflecting units, such as those illustrated at 14, 24, 28, 35a, 35b, 73a and 73b have been previously described as trihedral light-reflecting units having three mutually perpendicular facets. FIGS. 9 through 16 illustrate some of the configurations such trihedral units may take. These may be summarized as cube corners, rectangular parallelepipeds, truncated rectangular parallelepipeds, and truncated cube corners. In all of the figures, it will be appreciated that the light-reflecting units are shown greatly oversize to facilitate their illustration and description.

Figure 9:
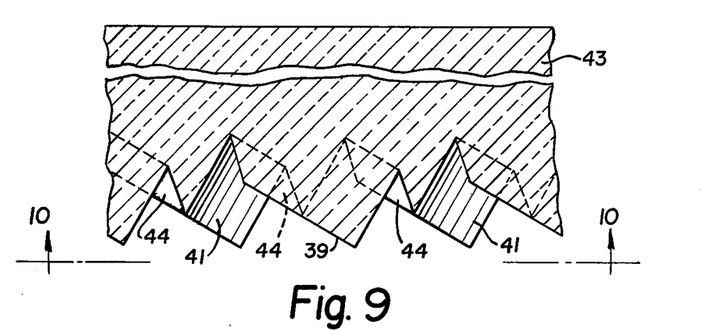
FIG. 9 is a fragmentary, enlarged, longitudinal section of a present marking tape and a section of FIG. 10 on the line 9—9, and shows the use of cube corners as light-reflecting units.
Figure 10:
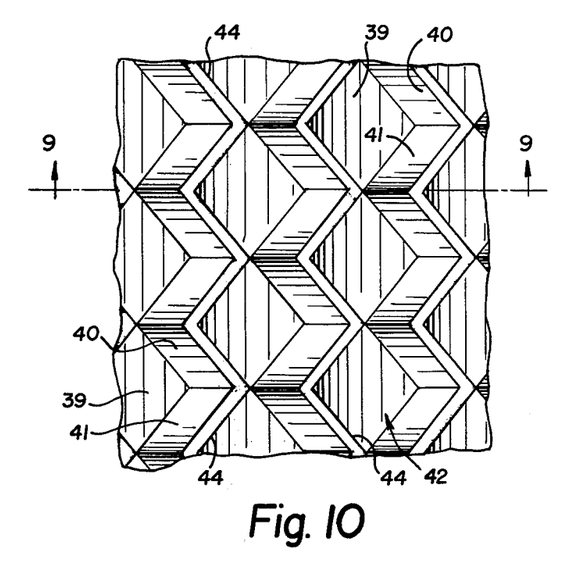
FIG. 10 is a view of FIG. 9 on the plane of the line 10—10.

FIGS. 9 and 10 illustrate light-reflecting units which are cube corners, sometimes referred to as triple reflectors, in which the light-reflecting unit comprises three square faces which are mutually perpendicular. Since the sides are square and equal in size and thus simulate a cube, such a reflecting unit has come to be called a "cube corner." In FIGS. 9 and 10, the cooperating sides of a single cube corner unit are illustrated at 39, 40, and 41. Such a unit is repeated to form a row 42, and likewise such rows are repeated in parallel fashion to form a light-reflecting array along the underside of a marking tape 43. By the very nature of cube corners, it is difficult if not impossible to avoid optically inactive bands or blind spots 44 (FIG. 10) in forming the cube corners by pins. In a commercial production, rows of such pins are somewhat longitudinally offset with respect to each other unavoidably forming optically inactive bands 44 in the light-reflecting array. These bands represent loss of reflective area and accordingly diminish the effectiveness and light-reflecting intensity of the array. Also, while a cube corner structure provides satisfactory reflectance to light striking perpendicularly against an array or strip of cube corners, that is, generally parallel to the axes of the cube corners, its performance falls off fairly rapidly as incident light strikes the array at angles away from the normal to the surface of the cube corner array.

Figure 11:
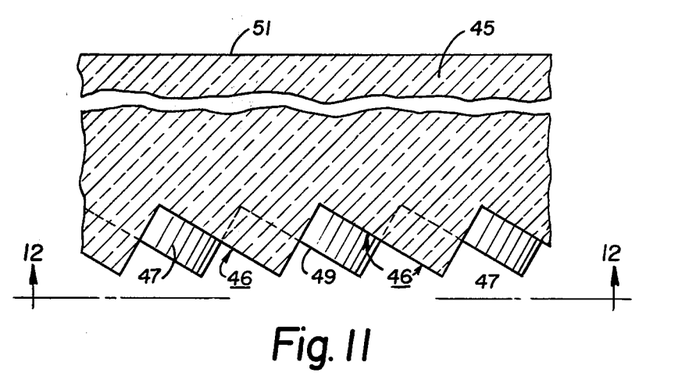
FIG. 11 is a fragmentary, enlarged longitudinal section of a present marking tape and illustrates the use of rectangular parallelepipeds as the light-reflecting units.
Figure 12:
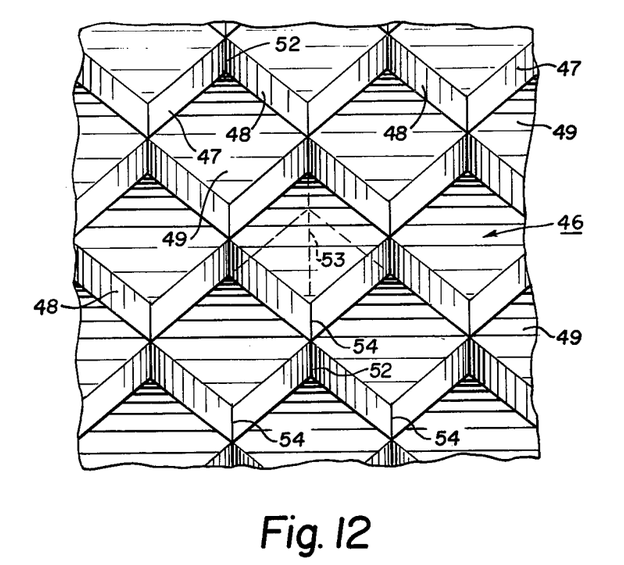
FIG. 12 is a view of FIG. 11 on the plane of the line 12—12.

A more preferred trihedral light-reflecting unit is illustrated by FIGS. 11 and 12 and is herein termed a rectangular parallelepiped. If a polyhedron is a solid bounded by planes, and a prism is a polyhedron of which two faces are congruent polygons in parallel planes, and the other faces are parallelograms having two of their sides in the two parallel planes, a parallelepiped may be broadly defined as a prism whose bases are parallelograms. A right parallelepiped, then, is a parallelepiped with edges perpendicular to the bases. The term "rectangular parallelepiped" can mean a right parallelepiped whose bases or sides are rectangles. However, some authorities broadly define a rectangle as a parallelogram whose four angles are right angles. This definition generically includes a square as a rectangle. At least two of the three rectangular faces which form the present rectangular parallelepiped light-reflecting unit cannot be square. Each of the at least two faces must be rectangular under the more generally used definition that two adjacent edges of a rectangle are unequal. As used here and in the claims, the term "rectangular parallelepiped" means a right parallelepiped of which at least two faces or facets are rectangular in the sense that each such rectangle has two adjacent unequal edges.

The rectangular parallelepiped herein contemplated may be regarded as the volume occupied by a six-faceted box, all six facets being a quadrilateral with four right angles. In an actual light-reflecting unit, only three of the facets which meet in a point are actually exposed on the underside of the tape, at least two those facets being rectangular in which two adjacent edges of each of the two rectangular facets are unequal. Preferably, the two rectangular facets, as defined, are equal in size or area, and the third facet is a square. The three facets of the rectangular parallelepiped may also be considered as forming the sides of a trihedral angle with two facets being rectangular as defined.

Referring to FIGS. 11 and 12, a marking tape 45 has a plurality of light-reflecting units 46 along its underside comprising three mutually perpendicular facets 47, 48, and 49 which define a trihedral angle of a rectangular parallelepiped as described. Facets 47 and 48 intersect each other in a direction toward refracting surface 51 of tape 45 to form an intersecting line 52 and define the two rectangular facets of the rectangular parallelepiped previously described. Facet 49 is a square in the preferred embodiment. A light-reflecting unit 46 is preferably so positioned with respect to refracting face 51 that a body diagonal of the rectangular parallelepiped which is also its optical axis is preferably substantially parallel to incident light refracted by surface 51, although the body diagonal can deviate therefrom up to about 15 degrees. A body diagonal connecting opposite corners of the rectangular parallelepiped of a unit 46 is shown at 53 in FIG. 12. In the preferred form, facets 47 and 48 intersect facets of adjoining light-reflecting units 46 in a direction away from retracting surface 51 to form a second intersecting line 54. This line is not only substantially parallel to the first mentioned intersecting line 52 but, in the embodiment illustrated, is substantially aligned with intersecting line 52 of an adjacent row.

Figure 13:
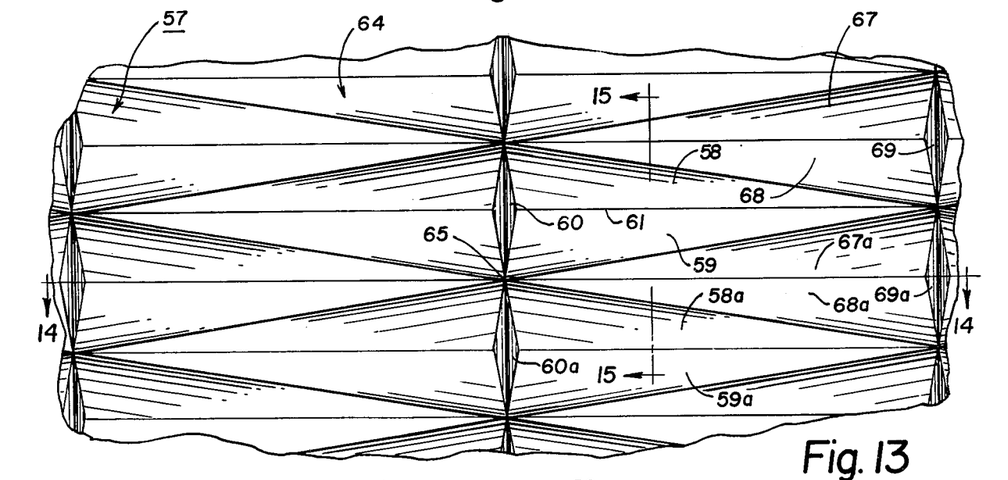
FIG. 13 is a fragmentary, enlarged, bottom plan view of a marking tape having triangular-based pyramids as light-reflecting units.
Figure 14:
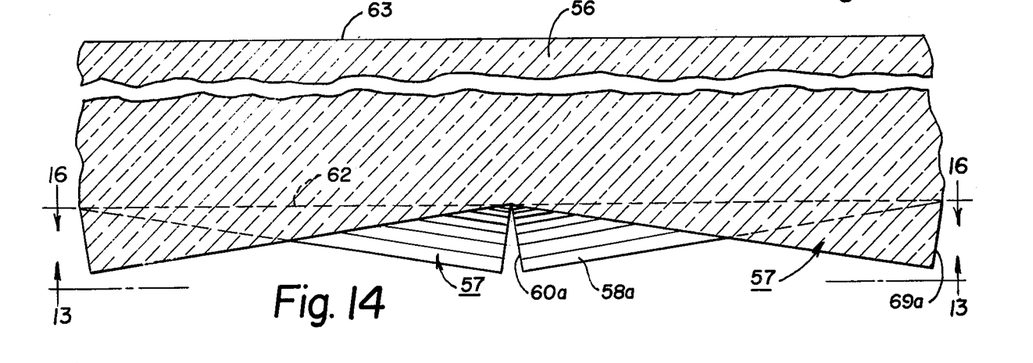
FIGS. 14 and 15 are sections of FIG. 13 on the lines 14—14 and 15—15, respectively.
Figure 15:
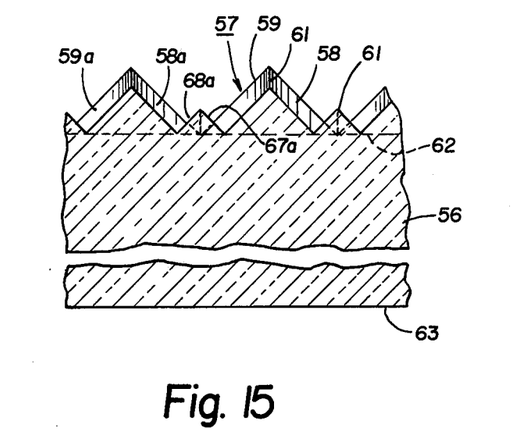

The best light-reflecting unit found to date for the marking tape is that of a triangular based pyramid as illustrated by FIGS. 13, 14, and 15. This unit is well suited for light having high angles of incidence (grazing incidence) which is needed in a marking tape, and by virtue of its configuration such a unit can readily be nested with other like units to provide bidirectional retroreflection. More particularly, this type of unit is a truncated rectangular parallelepiped forming an asymmetrical triangular-based pyramid. The three mutually perpendicular facets are those facets which meet the triangular base, one of the facets having a much smaller area than the other two. Such pyramids can be formed, for example, by cutting three parallel sets of grooves at specific spacings and angles, note FIG. 13. The width and depth of the grooves may be varied depending on the retroreflection desired. Each groove forms two adjacent facets of two different pyramids. The resulting reflector has two optical axes and therefore is bidirectional in light reflection, each axis being at the same angle to the surface normal but in opposite azimuthal directions.

Referring to FIGS. 13 to 15, a marking tape 56 has a plurality of light-reflecting units generally represented at 57. Each unit 57 has three mutually perpendicular facets indicated at 58, 59, and 60. Facets 58 and 59 converge as viewed in FIG. 13 to an intersecting line 61 and are perpendicular to facet 60. The pyramid of the three facets 58, 59, and 60 define a unit 57 which projects from the plane of the bottom of underside of tape 56, such that the base of the pyramid from which facets 58, 59, and 60 extend actually merges with the body of tape 56. The triangular bases of the pyramids may, therefore, be contained in an imaginary plane indicated in FIGS. 14 and 15 at 62, plane 62 being essentially parallel to a refracting surface 63 of tape 56.

As shown in FIG. 13, light-reflecting units 57 are placed in juxtaposed rows indicated at 64, each row being placed transversely to the direction of light to be retroreflected. Each row 64 consists of pyramidal units arranged in alternating order, such that the transversely disposed facets 60 and 60a of two adjacent pyramids are separated by a point 65 of an intervening third pyramid. This alternating positioning enables the array of units 57 to be bidirectional. Thus, as viewed in FIGS. 13 and 14, facets 58, 59, and 60 of one light-reflecting unit and facets 58a, 59a, and 60a of another similarly disposed light-reflecting unit and still other units similarly disposed receive and retroreflect light coming from the right. In contrast, facets 67, 68, and 69 of one light-reflecting unit and facets 67a, 68a, and 69a of another light-reflecting unit as well as other units similarly disposed receive and retroreflect light coming from the left. Each row 64 optically behaves the same.

Figure 16:
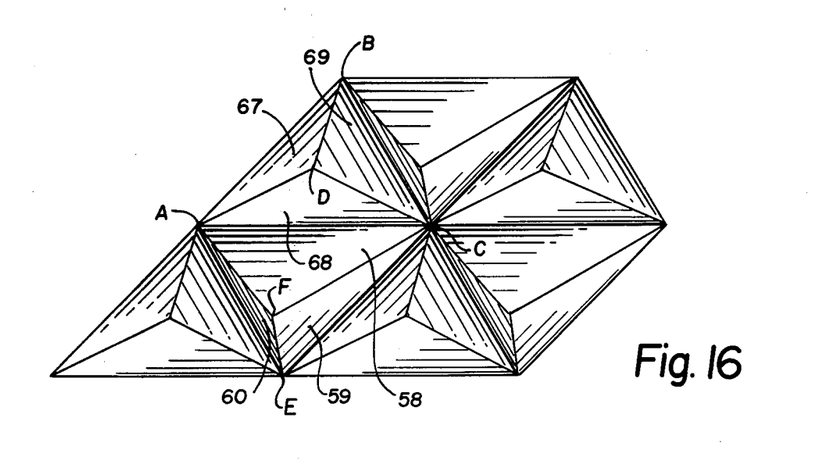
FIG. 16 is a perspective view of triangular-based pyramidal light-reflecting units in which the outlines of the bases of the pyramids are isosceles triangles.

When the pyramidal units 57 are truncated rectangular parallelepipeds, the outlines of the triangular bases of the projecting pyramids are isosceles triangles. When the pyramidal units are truncated cube corners, the outlines of the triangular bases of the projecting pyramids are equilateral triangles. As a further guide in illustrating the pyramidal type of light-reflecting unit, FIG. 16 illustrates a perspective view of truncated rectangular parallelepipeds. FIG. 16 is taken on the imaginary plane 62 of FIG. 14.

In FIG. 16, for instance, the plane of the sheet of drawing contains the triangular bases of the pyramidal light-reflecting units 57. Thus, points A, B, and C lie in the plane of the sheet of drawing and point D lies depressed below the plane of the sheet of drawing. The pyramid defined by points ABCD is a truncated rectangular parallelepiped, and the outline of base ABC is an isosceles triangle. Similarly, points A, C, and E lie in the plane of the sheet of drawing and point F lies depressed below the plane of the sheet of drawing. The pyramid defined by points ACEF is also a truncated rectangular parallelepiped, and the outline of base ACE is an isosceles triangle. In the case of a truncated cube corner, the outline of base ABC or base ACE is an equilateral triangle.

It will be apparent that all light-reflecting units can be metallized to aid in their reflecting function as illustrated at 17 in FIG. 2. In the other figures, metallization has not been shown to facilitate illustration of the structures.

Although the foregoing describes several embodiments of the present invention, it is understood that the invention may be practiced in still other forms within the scope of the following claims.

We claim:

1. A retroreflective marking material for a roadway and the like comprising in combination:
    (a) a substantially continuous sheet having at least some light-transmitting portions, a light-refracting surface on one side adapted to be exposed, and a plurality of trihedral light-reflecting units having three mutually perpendicular facets on the other side,
    (b) light-garnering and refracting receptors of polygonal cross-section elevated above and spaced along said one side of the sheet, and said receptors being free of light-reflecting units on their exposed sides which are co-extensive with said exposed one side of the sheet and adapted to direct light toward said light-reflecting units on said other side of the sheet,
    (c) said light-reflecting units being oriented to reflect light striking said exposed side of said sheet at relatively high angles of incidence, and
    (d) said sheet being adapted to be directly adhered along said other side to said roadway and the like.

2. The marking material of claim 1 in which said light-receptors have a triangular cross-section disposed in said one direction of the sheet.

3. The marking material of claim 1 in which said light-receptors have a quadrilateral cross-section disposed in said one direction of the sheet.

4. The marking material of claim 1 in which said trihedral light-reflecting units occur on said other side of the sheet substantially opposite said light-receptors, some of said trihedral light-reflecting units being disposed to retroflect light in one direction and some of said trihedral light-reflecting units being disposed to retroflect light in the opposite direction, whereby said marking material is bidirectional with respect to retroreflecting light.

5. The marking material of claim 1 in which said light-receptors are elastically deformable and adapted to return substantially to their original positions after deformation.

6. The marking material of claim 1 in which said light-receptors are hollow and composed of elastically deformable material adapted to return substantially to its original position after deformation, and said light-reflecting units are disposed along an inner side of the hollow light-receptors.

7. The marking material of claim 1 in which said light-receptors are hollow and open from said other side of the sheet and composed of elastically deformable material adapted to return substantially to its original position after deformation, said light-reflecting units are disposed along inner and opposite sides of the light-receptors to render them bidirectional with respect to retroreflecting light.

8. The marking material of claim 1 in which said trihedral light-reflecting units are so disposed that their optical axes are within 15 degrees of the direction of the refracted light.

9. The marking material of claim 1 in which said trihedral light-reflecting units are so disposed that their axes are substantially parallel to the direction of the refracted light.

10. The marking material of claim 9 in which said light-reflecting units are metallized.

11. The marking material of claim 1 in which said trihedral light-reflecting units are cube corners.

12. The marking material of claim 1 in which said trihedral light-reflecting units are rectangular parallelepipeds.

13. The marking material of claim 1 in which said trihedral light-reflecting units are triangular-based pyramids.

14. The marking material of claim 13 in which the outlines of the bases of said pyramids are isosceles triangles.

15. The marking material of claim 13 in which the outlines of the bases of said pyramids are equilateral triangles.

16. A retroreflective marking tape for a roadway and the like comprising a substantially continuous light-transmitting strip having one side adapted to be exposed provided with light-receptors which rise above said one side and are spaced apart lengthwise of the strip, and light-reflecting units formed at the interface of said light-receptors and said one side of the strip, the other side of said strip being adapted to be directly adhered to said roadway and the like.

17. The retroreflective marking tape of claim 16 in which said light-reflecting units are formed in a light-receptor, and an adhesive substantially fills said units and adheres said light-receptor to said one side of the strip.

18. The retroreflective marking tape of claim 16 in which said light-reflecting units are formed in said one side of the strip, a light-receptor seats over said light-reflecting units, and a light-transmitting adhesive fills said light-reflecting units and adheres together said light-receptor and said one side of the strip.

19. An integral, retroreflective tape for marking a roadway and the like, effective whether wet or dry, comprising a substantially continuous light-transmitting strip having a light-refracting surface on one side adapted to be exposed and having light-receptors which rise above said side and are spaced apart lengthwise of the strip, a plurality of trihedral light-reflecting units on the other side of the strip, said other side being adapted to be directly adhered to said roadway and the like, said trihedral light-reflecting units comprising juxtaposed rows of units disposed transversely to the direction of the light to be reflected, each row of units comprising three-faceted, triangular-based pyramids, said three facets being mutually perpendicular, and said pyramids being arranged in alternating order, such that the transversely disposed facets of two adjacent pyramids are separated by the point of an intervening third pyramid.

20. The marking tape of claim 19 in which said pyramidal light-reflecting units are on said other side of the strip substantially opposite to said light-receptors, the bases of said pyramids merging with and forming a part of said strip.

21. The marking tape of claim 19 in which said pyramidal light-reflecting units are formed at the interface of said light-receptors and said one side of the strip.

22. The marking tape of claim 19 in which said pyramidal light-reflecting units are metallized.

23. The marking tape of claim 19 in which the outlines of the bases of said pyramids are isosceles triangles.

24. The marking tape of claim 19 in which the outlines of the bases of said pyramids are equilateral triangles.

* * * * *

UNITED STATES PATENT AND TRADEMARK OFFICE
CERTIFICATE OF CORRECTION

PATENT NO. : 4,182,548

DATED : January 8, 1980

INVENTOR(S) : Charles E. Searight et al.

It is certified that error appears in the above—identified patent and that said Letters Patent is hereby corrected as shown below:

On the title page, Item [45] should read -- January 8, 1980 --.

Signed and Sealed this

Twenty-first Day of October 1980

[SEAL]

Attest:

SIDNEY A. DIAMOND

Attesting Officer

Commissioner of Patents and Trademarks